US010017241B2

(12) United States Patent
Jones (10) Patent No.: US 10,017,241 B2
(45) Date of Patent: Jul. 10, 2018

(54) SHOCK ABSORBER ASSEMBLY FOR POWER DRIVE UNIT OF A VEHICLE

(71) Applicant: THE BOEING COMPANY, Chicago, IL (US)

(72) Inventor: Kelly Thomas Jones, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 631 days.

(21) Appl. No.: 14/630,226

(22) Filed: Feb. 24, 2015

(65) Prior Publication Data

US 2016/0244151 A1    Aug. 25, 2016

(51) Int. Cl.
| | |
|---|---|
| *B64C 3/38* | (2006.01) |
| *B64C 5/10* | (2006.01) |
| *B64C 9/00* | (2006.01) |
| *B64C 13/00* | (2006.01) |
| *F16F 15/129* | (2006.01) |
| *F16F 15/123* | (2006.01) |
| *B64C 9/02* | (2006.01) |
| *B64C 3/48* | (2006.01) |
| *F16F 15/14* | (2006.01) |

(52) U.S. Cl.
CPC ............... *B64C 13/00* (2013.01); *B64C 3/48* (2013.01); *B64C 9/02* (2013.01); *F16F 15/129* (2013.01); *F16F 15/12353* (2013.01); *F16F 15/1457* (2013.01)

(58) Field of Classification Search
CPC ...... B64C 9/02; B64C 13/00; F16F 15/12353; F16F 15/129
See application file for complete search history.

(56) References Cited

U.S. PATENT DOCUMENTS

| | | | | |
|---|---|---|---|---|
| 5,673,778 | A | * | 10/1997 | Ament ................. F16F 15/129 |
| | | | | 192/213.12 |
| 5,687,828 | A | * | 11/1997 | Ament ............. F16F 15/12313 |
| | | | | 192/213.1 |
| 5,722,525 | A | * | 3/1998 | Ament ................. F16F 15/129 |
| | | | | 192/204 |
| 5,725,080 | A | * | 3/1998 | Lohaus ................ F16F 15/123 |
| | | | | 192/213.22 |
| 5,878,856 | A | * | 3/1999 | Sudau ................ F16F 15/1206 |
| | | | | 192/11 OR |

(Continued)

FOREIGN PATENT DOCUMENTS

| | | |
|---|---|---|
| DE | 102014204947 | 10/2014 |
| EP | 1460303 | 9/2004 |

OTHER PUBLICATIONS

Extended European Search Report for EP 15202324.8-1755/3061988, dated Sep. 27, 2016.

*Primary Examiner* — Philip J Bonzell
(74) *Attorney, Agent, or Firm* — Joseph M. Butscher; The Small Patent Law Group, LLC (57) ABSTRACT

A shock absorber assembly is configured to be operatively connected to a drive shaft of a power drive unit (PDU) of an aircraft. The shock absorber assembly may include a first hub, a second hub, and a bull gear having at least a portion sandwiched between the first and second hubs. The bull gear is configured to rotate independently of the first and second hubs a controlled distance in response to a mechanical malfunction of the PDU.

20 Claims, 7 Drawing Sheets

(56) References Cited

U.S. PATENT DOCUMENTS

| | | | |
|---|---|---|---|
| 6,375,575 B2 * | 4/2002 | Hashimoto | F16F 15/129 |
| | | | 192/213.22 |
| 6,419,606 B1 | 7/2002 | Tengan | |
| 6,789,655 B2 * | 9/2004 | Hashimoto | F16F 15/129 |
| | | | 192/209 |
| 8,226,049 B2 | 7/2012 | Jones | |
| 2008/0261706 A1 * | 10/2008 | Ament | F16F 15/1232 |
| | | | 464/98 |
| 2013/0118859 A1 | 5/2013 | Copeland | |
| 2015/0291175 A1 * | 10/2015 | Harada | B60K 6/445 |
| | | | 701/22 |

\* cited by examiner

SHOCK ABSORBER ASSEMBLY FOR POWER DRIVE UNIT OF A VEHICLE

BACKGROUND OF THE DISCLOSURE

Embodiments of the present disclosure generally relate to shock absorber assemblies that may be used with power drive units of vehicles, such as an aircraft.

Aircraft typically include movable control surfaces for directional control in flight. Known control surfaces include ailerons for roll control, elevators for pitch control, and rudders for yaw control. Additionally, various jet transport aircraft include leading edge slats and trailing edge flaps on the wings, which may be used to generate high lift during takeoff and landing when the aircraft is traveling at relatively low air speeds.

Power drive units (PDUs) are typically used to drive high lift surfaces on transport aircraft. Each surface is driven by two drive stations. A single drive line is routed from a PDU to actuators on both sides of the aircraft. In the event of a mechanical jam, or when the system is inadvertently driven into an over-travel stop, all the available PDU torque concentrates into the point of the jam. Torque limiters and torque brakes are often employed to limit the maximum amount of torque that may be delivered to specific points in the drive system.

In addition to local torque brakes at each actuator, half system torque brakes are sometimes used to limit the amount of torque delivered to one wing, thereby allowing a reduction in the size of drive line components between the PDU and the point of the jam. When an actual jam occurs at one or more points downstream of the half system torque brake, a second jam occurs in the drive line between the motor and the half system torque brake after the half system torque brake locks.

In general, a magnitude of the jam torque experienced by the drive system is equal to the stall torque of the primary mover (such as a hydraulic or electric motor) plus the torque supplied by the kinetic energy of the motor rotor. The kinetic torque is influenced by the driveline stiffness between the motor rotor and the point of the jam. With half system torque limiters, the distance between the motor and the torque brake is relatively short. Indeed, the two devices are typically mounted to the same housing. As such, the stiffness between the torque brake and the motor is relatively high, which leads to an induced kinetic torque to also be relatively high. Often, the kinetic torque approaches or exceeds the value of the motor stall torque. In order to reduce the magnitude of the kinetic torque, the motor rotor is decelerated over a period of time (generally, the longer the deceleration time, the less than magnitude of the kinetic torque). One method of decelerating the motor rotor is to introduce compliance in the drive line path between the motor and the torque brake.

Known half system torque brakes often utilize shock absorbers that include ring springs (also known as Fedder springs). With these shock absorbers, when torque in a first output shaft exceeds a predetermined level, a ball rolls up ramps machined into cam plates, thereby compressing Belleville springs and clamping brake plates. When the output shaft of the PDU stops rotating, substantial kinetic energy is still present in the motor rotor, which leads to additional kinetic torque that causes an input cam plate to continue to rotate with respect to an output cam and the ball to roll farther up the ramps. The continued motion of the ball causes the output cam to axially move, thereby compressing ring springs. In general, a shock absorber is operatively connected to each torque brake. Further, if the ring springs resonate, the cam plate may be susceptible to reversing direction and unlock the torque brake, thereby allowing excess torque to bleed through to the output shaft.

As can be appreciated, using a shock absorber with respect to each torque limiter adds costs to the overall system. Further, each shock absorber includes numerous parts, such as the individual ring springs, thereby adding weight and expense to the system.

Accordingly, a need exists for a more efficient system and method of absorbing shocks within a PDU.

SUMMARY OF THE DISCLOSURE

Certain embodiments of the present disclosure provide a shock absorber assembly configured to be operatively connected to a drive shaft of a power drive unit (PDU) of an aircraft. The shock absorber assembly may include a first hub, a second hub, and a bull gear having at least a portion sandwiched between the first and second hubs. The bull gear is configured to rotate independently of the first and second hubs a controlled distance in response to a mechanical malfunction of the PDU. The first hub may be a mirror image of the second hub.

The shock absorber assembly may also include brake lining secured to one or more of the first hub, the second hub, and the bull gear. The brake lining provides a frictional interface between the bull gear and the first and/or second hubs. The brake lining provides a coefficient of friction that causes the bull gear to rotate along with the first and second hubs during normal operation of the PDU. The brake lining dissipates at least a portion of torque energy during the mechanical malfunction. In at least one embodiment, the brake lining may include one or more of engineered paper, asbestos-based brake lining material, bronze on steel, steel on steel, or paper on steel.

Each of the first hub, the second hub, and the bull gear may include a plurality of channels. The channels of the first hub align with the channels of the second hub and those of the bull gear. The channels retain force-resisting elements that are configured to dissipate at least a portion of torque energy during the mechanical malfunction. For example, the force-resisting elements may be or include helical springs.

The shock absorber assembly may also include one or more bearings. The bull gear may be rotatably secured to the bearing(s). At least one of the bull gear and the one or more bearings may include a shaft channel. The drive shaft is configured to be secured within the shaft channel.

The first and second hubs may be securely fixed together in order to prevent the first hub from rotating relative to the second hub. In contrast, the bull gear may include a plurality of fastener channels. Each of the fastener channels slidably retains a portion of a fastener that securely fastens the first hub to the second hub.

Certain embodiments of the present disclosure provide an aircraft that may include a fuselage, and wings securely fixed to the fuselage. Each of the wings includes a plurality of control surfaces, and a power drive unit (PDU) coupled to a drive shaft that is operatively coupled to one or more of the plurality of control surfaces. The PDU includes first and second torque brakes operatively coupled to the drive shaft. The aircraft also includes a shock absorber assembly operatively coupled to the drive shaft between the first and second torque brakes. The shock absorber assembly may include a first hub, a second hub, and a bull gear having at least a portion sandwiched between the first and second hubs. The bull gear is configured to rotate independently of the first and second hubs in response to a mechanical malfunction of the PDU.

DETAILED DESCRIPTION OF THE DISCLOSURE

The foregoing summary, as well as the following detailed description of certain embodiments will be better understood when read in conjunction with the appended drawings. As used herein, an element or step recited in the singular and proceeded with the word "a" or "an" should be understood as not excluding plural of the elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide a shock absorber assembly that may include a bull gear having at least a portion sandwiched between two hubs, which may be lined with brake material. The bull gear may be mounted on a pair of rolling element bearings connected to the hubs. Torque may be transmitted from the bull gear to the hubs via helical compression springs, for example. The springs may be sized so that they do not bottom out when subjected to a stall torque plus a kinetic torque provided by the motor. The amount of damping may be controlled by a radius of the brake lining material between the bull gear and the hubs, and the clamping force therebetween.

In at least one embodiment, the damping (that is, the shock absorption) may be set to zero if desired (for example, no brake material or clamping pressure). The springs may be trapped in the assembly with simple covers to prevent migration within the PDU in the event of a spring failure.

Because the shock absorber assembly may be positioned within a load path of a PDU before it is split (such as between left and right wings), a single shock absorber assembly may be used, thereby reducing part count in comparison to previously known systems. The stiffness of the load path may be dominated by the spring stiffness and may not be affected by a coefficient of friction (in contrast to shock absorbers using ring springs).

Embodiments of the present disclosure do not require an additional degree of freedom for the torque brake input cam (for example, axial movement), thereby reducing the possibility of dynamic instability and providing a simple and efficient shock absorber assembly.

Certain embodiments of the present disclosure provide a shock absorber assembly that provides shock absorption or damping between a bull gear and hubs, such as through brake lining secured to interface surfaces of the bull gear and/or hubs. The shock absorber assembly may be configured to transmit a radial load component from the bull gear to the hub.

Figure 1:
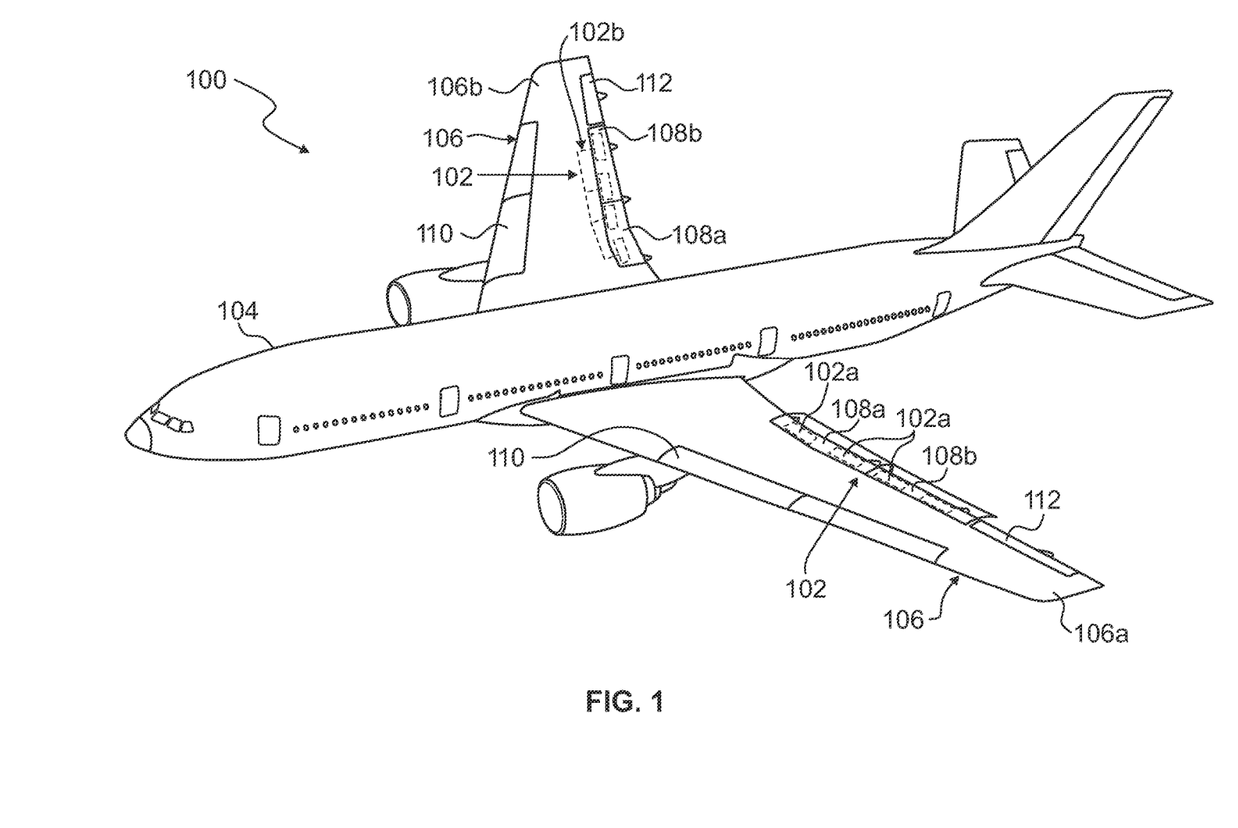
FIG. 1 illustrates a partially schematic, perspective top view of an aircraft having a control surface drive system, according to an embodiment of the present disclosure.

FIG. 1 illustrates a partially schematic, top perspective view of an aircraft 100 having a control surface drive system 102, according to an embodiment of the present disclosure. The aircraft 100 may include a fuselage 104 and wings 106 (shown as first and second wings 106a and 106b) securely fixed to the fuselage 104. Each wing 106 may include a number of movable control surfaces for controlling the aircraft 100 during flight. The control surfaces may include trailing edge flaps 108, leading edge slats 110, and ailerons 112. The trailing edge flaps 108, which are shown as an inboard flap 108a and an outboard flap 108b, are used for generating increased lift during takeoff and landing of the aircraft 100.

The trailing edge flaps 108 may be powered by the control surface drive system 102, which may include a drive shaft (not shown in FIG. 1) that extends longitudinally inside the wings 106, for example. The drive shaft may be coupled to a central power drive unit (PDU). One or more shock absorber assemblies, as described below, may be operatively connected to the drive shaft of the PDU, for example.

In operation, the control surface drive system 102 may move the flaps 108 between a retracted position (shown by solid lines) and an extended position (shown by dashed lines). In the extended position, aerodynamic forces may be exerted on the flaps 108. The control surface drive system 102 is configured to hold the flaps 108 in the extended position against the aerodynamic forces without any input by the pilot of the aircraft 100, even in the event of a general power failure. The control surface drive system 102 may be configured to lock the flaps 108 in the extended position, the retracted position, or any intermediate position therebetween against the aerodynamic forces, as described in U.S. Pat. No. 8,226,049, entitled "Aircraft Control Surface Methods," which is hereby incorporated by reference in its entirety.

Figure 2:
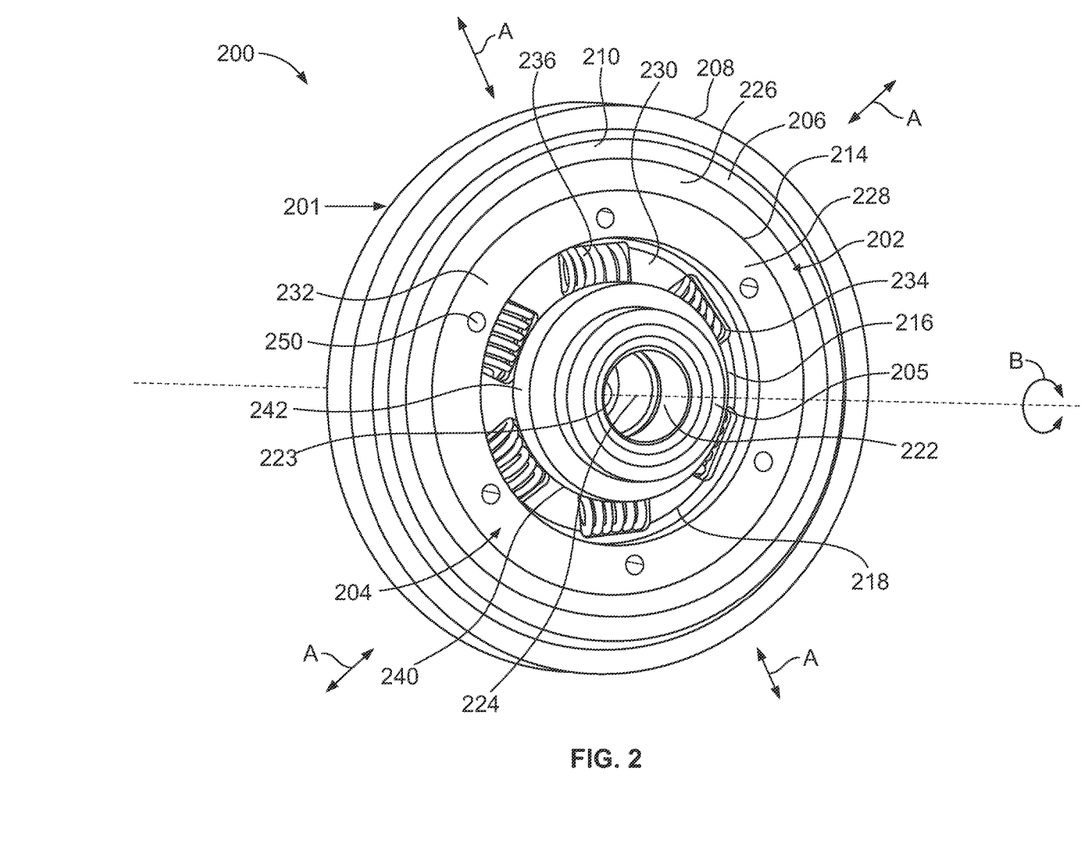
FIG. 2 illustrates a perspective front view of a shock absorber assembly, according to an embodiment of the present disclosure.

FIG. 2 illustrates a perspective front view of a shock absorber assembly 200, according to an embodiment of the present disclosure. The shock absorber assembly 200 includes a bull gear 201 rotatably connected to a first hub 204 through a first bearing 202 (such as an outer or outboard bearing). The first hub 204 may be an outer or outboard hub (in relation to a central longitudinal axis 224 of the shock absorber assembly 200). The bull gear 201 includes a main body 206 having an interior portion that is sandwiched between a portion of the first hub 204 and a portion of a second hub (hidden from view in FIG. 2), such as an inner or inboard hub (in relation to the central longitudinal axis 224). The first hub 204 and the second hub may be mirror images of one another and sandwich the interior portion of the bull gear 201 therebetween. That is, the shapes of the first and second hubs may mirror each other (not that one of the hubs is a literal mirror image of the other).

The bull gear 201 may be formed of metal. An outer annular edge 208 radially extends from the main body 206. An upstanding annular ridge 210 may outwardly extend from the main body 206 inboard (that is, closer to the central longitudinal axis 224) from the edge 208. The annular ridge 210 may define an inboard recessed area within the main body 206 that in which the first bearing 202 is positioned between an interior surface of the ridge 210 and an exterior annular edge 214 of the first hub 204. The main body 206 of the bull gear 201 may also be slidably supported by a second bearing 216 (such as an interior or inboard bearing) having a circumferential base 218, which may be disposed between the first hub 204 and an inner collar 205 of the bull gear 201.

A shaft channel 222 is formed through the inner collar 205. The shaft channel 222 is configured to securely connect to an outer surface of a drive shaft 223 of a PDU. The bull gear 201, the bearing 202, the first hub 204, the second hub, and the bearing 216 may be concentric with the central longitudinal axis 224 of the shock absorber assembly 200. That is, the central longitudinal axes of the bull gear 201, the bearing 202, the first hub 204, the second hub, and the bearing 216 may be axially aligned and coincident with the central longitudinal axis 224.

The first bearing 202 may be formed of metal and may include an annular rim 226 that is positioned within the recessed area between the ridge 210 of the bull gear 201 and the exterior annular edge 214 of the first hub 204. The first bearing 202 is configured to constrain relative motion and reduce friction between the bull gear 201 and the first hub 204. For example, the bearing 202 may be configured to restrain radial shifts in the directions of arrows A, for example, between the bull gear 201 and the first hub 204. As explained below, however, in the event of a mechanical jam, for example, the bearing 202 allows the bull gear 201 to axially rotate (that is, rotate in a direction about the central longitudinal axis 224 of the shock absorber assembly 200) in the direction of arc B relative to the first hub 204 and/or the second hub.

The first hub 204 includes a planar annular rim 228 having the exterior annular edge 214. A recessed area 230 extends inwardly from the annular rim 228, and is recessed below a planar outer surface 232 of the annular rim 228. The recessed area 230 includes a plurality of spring channels 234 that are axially aligned with spring channels formed in the main body 206 of the bull gear 201 and spring channels formed in the second hub. The axially aligned spring channels, including the spring channels 234, are configured to receive and retain respective springs 236, such as helical coil springs. In general, the spring channels 234 align and cooperate with spring channels of the bull gear 201 and the second hub to provide spring channels that retain the springs 236.

As shown, the shock absorber assembly 200 includes six springs 236 retained in a respective number of aligned spring channels. The spring channels 234 (and the spring channels of the bull gear 201 and the second hub) may be regularly spaced around the shock absorber assembly 200 as shown. Alternatively, more or less springs channels that retain more or less springs than shown may be used. In at least one embodiment, the shock absorber assembly 200 may not include any springs 236.

The bearing 216 may be formed of metal and the circumferential base 218 may be positioned between an inner circumferential edge 240 (for example, an inner diameter) of the first hub 204 and an outer circumferential edge 242 (for example, an outer diameter) of the inner collar 205 of the bull gear 201. The first hub 204 may be securely and fixedly fastened to the second hub through fasteners (for example, bolts), such that they may not axially rotate in relation to one another. Alternatively, in the event of a mechanical jam, the first hub 204 and the second hub may be configured to axially rotate a controlled distance relative to one another.

As shown, fastener holes 250 may be regularly spaced about the first hub 204. The fastener holes 250 are configured to align with expanded channels (hidden from view in FIG. 2) within the bull gear 201 and fastener holes (hidden from view in FIG. 2) of the second hub. The diameter of the fastener holes 250 of the first hub 204 and the fastener holes of the second hub may be sized to threadably or otherwise securely retain and axially and radially fix in position fasteners, such as bolts. In this manner, when fastened together, the first and second hubs may not axially rotate or radially shift relative to one another. Further, when the hubs are fastened together through bolts, for example, the hubs exert a clamping force into the bull gear 201 to compressively sandwich the bull gear 201 between the hubs. Notably, however, the expanded channels of the bull gear 201, through which shafts of the fasteners pass, may provide arcuate, radial openings that are larger than the diameters of the fastener shafts, thereby providing the bull gear 201 the ability to axially shift or rotate in relation to the first and second hubs 204 and 265 over a controlled distance.

The controlled distance may be less than a full 360 degree rotation. For example, the controlled distance may be a rotation that does not exceed 90 degrees. In at least one embodiment, the controlled distance may be a rotation of less than 15 degrees.

Figure 3:
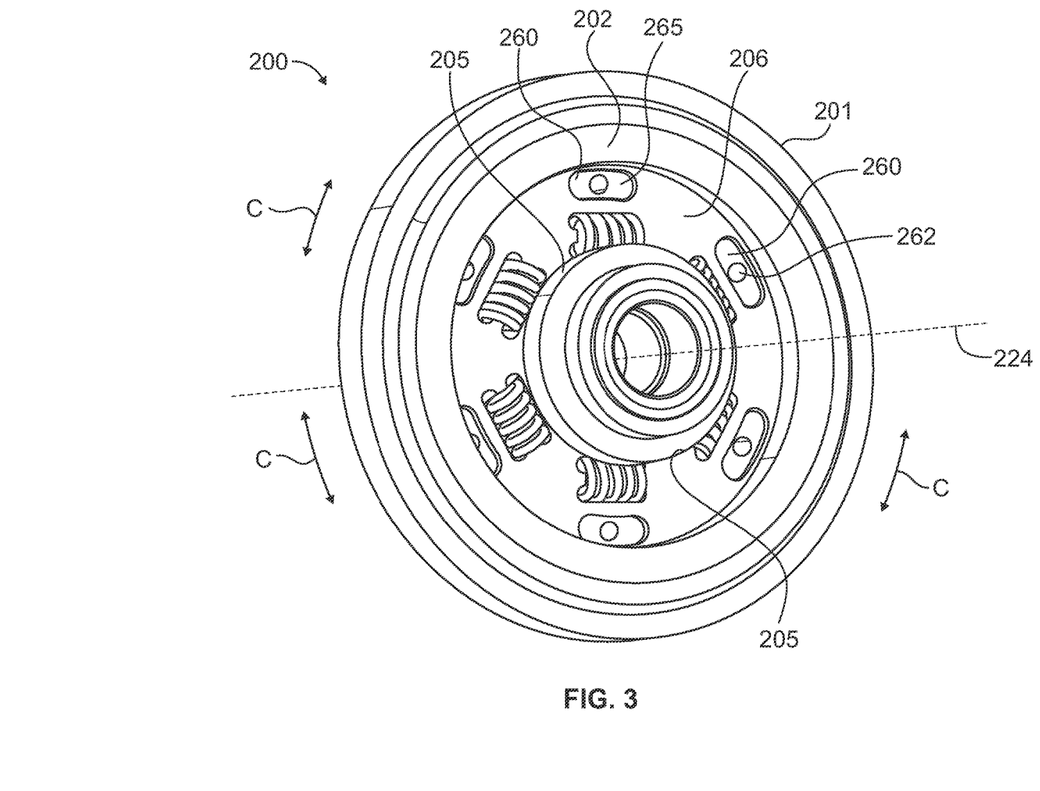
FIG. 3 illustrates a perspective front view of a shock absorber assembly with a first hub removed, according to an embodiment of the present disclosure.

FIG. 3 illustrates a perspective front view of the shock absorber assembly 200 with the first hub 204 (shown in FIG. 2) removed, according to an embodiment of the present disclosure. As noted above, the main body 206 of the bull gear 201 includes a plurality of regularly-spaced fastener channels 260. The fastener channels 260 may be expanded openings formed through the main body 206 and aligned with fastener holes 262 of the second hub 265 and the fastener holes 250 (shown in FIG. 2) of the first hub 204. Each of the fastener channels 262 may slidablyretain a portion of a fastener that securely fastens the first hub 204 to the second hub 265. That is, during a system malfunction in which the bull gear 201 rotates in relation to the first and second hubs 204 and 265, portions of the fasteners that fix the first hub 204 to the second hub 265 slide through the fastener channels 260 in an arcuate direction, as defined by the shape of the fastener channels 260. For example, each fastener channel 260 may include an arcuate segment aligned around the central longitudinal axis 224.

As noted, the second hub 265 may be a mirror image of the first hub 204, with at least a portion of the main body 206 of the bull gear 201 sandwiched therebetween. The fastener holes 250 and 262 may have a diameter that is large enough to receive a shaft of a fastener, such as a bolt, but prevent it from axially or radially shifting therein. In contrast, the expanded fastener channels 260 are larger than the diameter of the fastener shafts. Accordingly, while the fasteners may securely connect the first and second hubs 204 and 265 together and prevent axial and radial shifting therebetween, the fasteners may shift through the channels 260 a controlled distance defined by the length of the channels 260. Accordingly, the bull gear 201 may axially shift in relation to the first and second hubs 204 and 265 a controlled distance defined by the arcuate distance of each channel 260 in the axial directions of arcs C.

Figure 4:
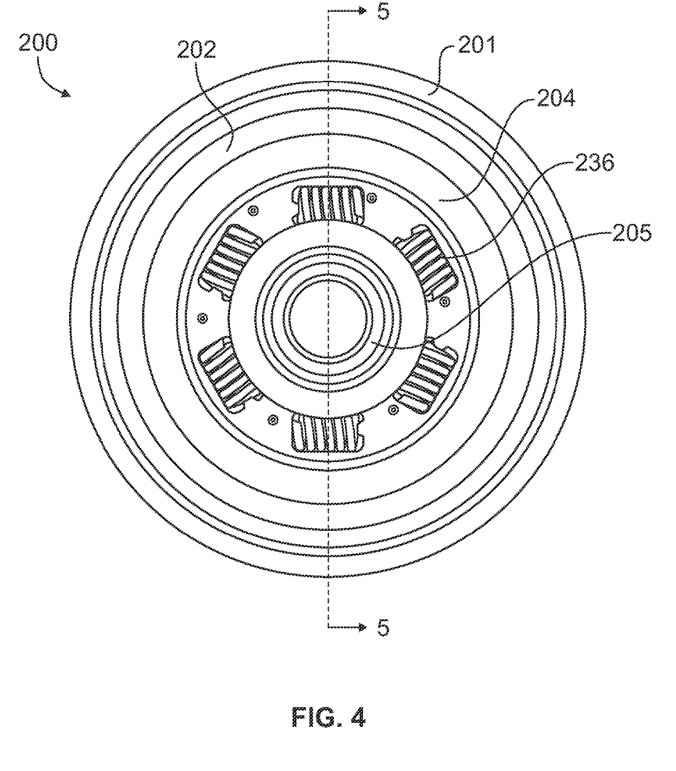
FIG. 4 illustrates a front view of a shock absorber assembly, according to an embodiment of the present disclosure.
Figure 5:
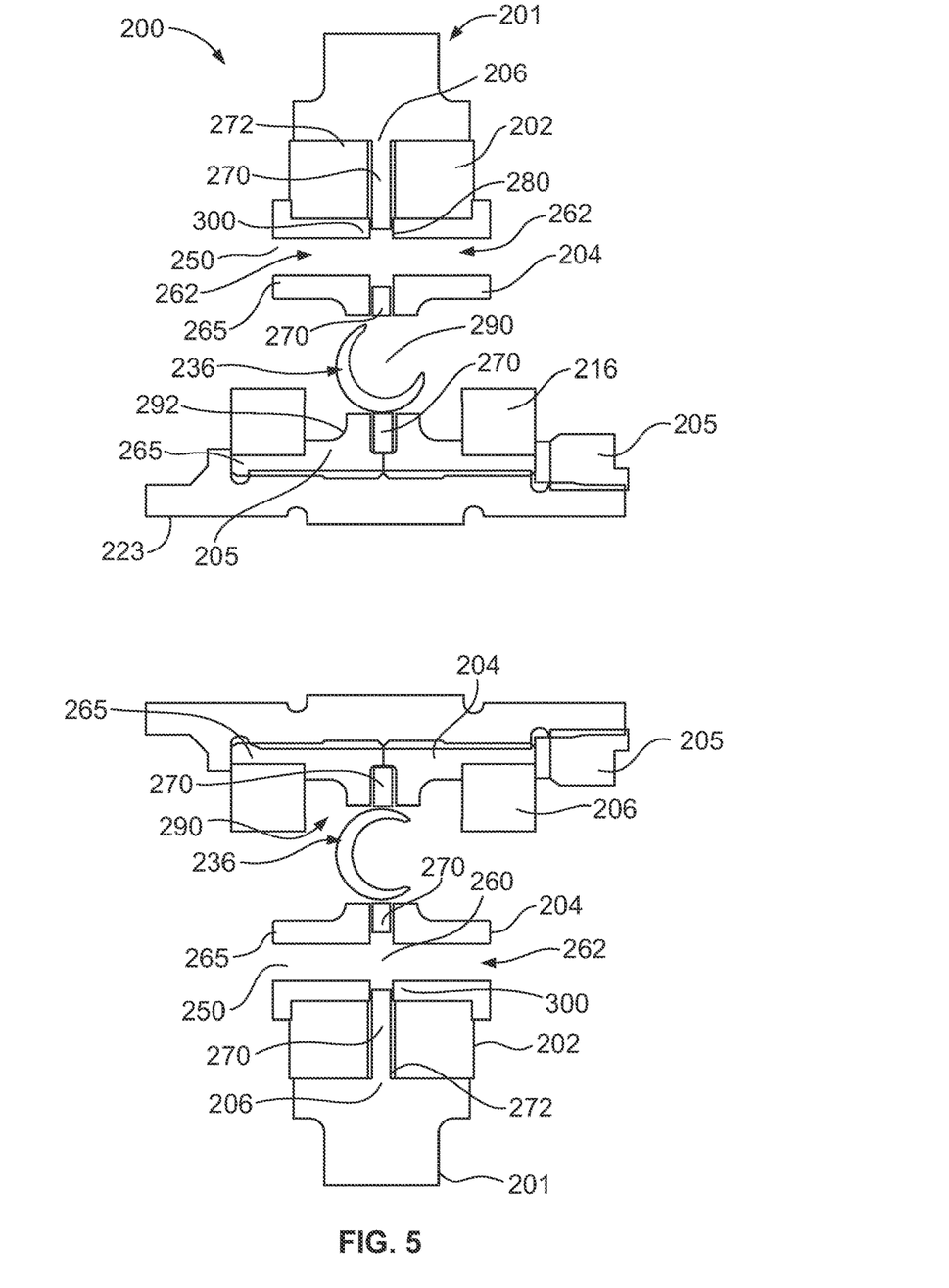
FIG. 5 illustrates a cross-sectional view of a shock absorber assembly through line 5-5 of FIG. 4, according to an embodiment of the present disclosure.

FIG. 4 illustrates a front view of the shock absorber assembly 200, according to an embodiment of the present disclosure. FIG. 5 illustrates a cross-sectional view of a shock absorber assembly 200 through line 5-5 of FIG. 4. Referring to FIGS. 4 and 5, the main body 206 of the bull gear 201 includes an interior recessed planar portion 270 that is received and retained within a reciprocal slot 272 formed through the bearing 202. The interior recessed planar portion 270 may be sandwiched between the mirror image hubs 204 and 265. The planar portion 270 extends through an outer separating gap 280 formed between the first hub 204 and the second hub 265, through the aligned spring channels 290, and into an inboard circumferential slot 292 formed through between the hubs 204 and 265 proximate to the drive shaft 223.

The interior surfaces of the first and second hubs 204 and 265 that define the slots 272 and 292 may be lined with a frictional component (for example, a component, such as a lining, that increases friction between two components), such as a brake lining 300. Optionally or additionally, the brake lining 300 may be secured to an outer surface of the planar portion 270 of the main body 206 of the bull gear 201 that interfaces with the first and second hubs 204 and 265. The brake lining 300 may include engineered paper, asbestos-based brake lining material, bronze on steel, steel on steel, paper on steel, and/or the like. In general, the brake lining 300 is formed to provide a controlled coefficient of friction. The brake lining 300 may be a thin layer of material. For example, the brake lining 300 may be 0.01" thick. Alternatively, the brake lining 300 may be thinner or thicker than 0.01".

In general, the amount of damping (for example, torque dissipation) may be controlled by a thickness of the brake lining 300 between the bull gear 201 and the hubs 204 and 265, as well as the clamping force exerted by the hubs 204 and 265 into the bull gear 201. Further, with increased clamping force on the brake lining 300, the greater the amount of force that is needed to overcome its coefficient of friction in order to independently rotate the bull gear 201 in relation to the hubs 204 and 265.

During normal operation of the shock absorber assembly, an actuator rotates the bull gear 201. Normal operation refers to operation of a system, such as a PDU, without any system malfunctions, such as mechanical jams. The brake lining 300 between the bull gear 201 and the first and second hubs 204 and 265 ensures that the first and second hubs 204 and 265 rotate along with the bull gear 201. For example, torque from a motor or actuator is transferred or otherwise transmitted from the bull gear 201 to the hubs 204 and 265 through the interface of the brake lining 300 therebetween and/or the springs 236. The brake lining interface and/or the spring force ensures that the bull gear 201 and the hubs 204 and 265 remain securely connected to one another during normal operation such that all three components rotate along with one another (such that the rotation of all three components may be in synchronization).

However, during a mechanical jam or other malfunction, such as when the drive shaft 223 immediately ceases, locks, or otherwise stops, the energy of the motor imparted into the bull gear 201 causes it to continue to rotate. During the system malfunction, the brake lining 300 is configured to allow the bull gear 201 to rotate in relation to the first and second hubs 204 and 265 over the controlled distance as defined by the fastener channels 260 in order to dissipate the torque energy exerted by the motor. As the bull gear 201 rotates relative to the first and second hubs 204 and 265, the springs 236 are compressed within the aligned spring channels 290. The springs 236 exert a resistive force into the edges of the bull gear 201, the first hub 204, and the second hub 265 that define the aligned spring channels 290. In this manner, torque energy may also be dissipated by the springs 236, which also prevents internal structures of the bull gear 201 from colliding with internal structures of the first and second hubs 204 and 265. The springs 236 also provide a restorative force to reposition the bull gear 201 to a neutral position with respect to the hubs 204 and 265 after the system malfunction ends and the system operates in a normal fashion.

Alternatively, instead of the springs 236, other force-resisting elements may be positioned within the channels 290. For example, blocks of open cell foam may be positioned within the channels. As another example, blocks or rubber may be positioned within the channels. Further, the channels 290 and the force-resisting elements, such as the springs 236, therein may be covered, such as with shrouds, casings, or the like, which prevent the force-resisting elements from ejecting from the channels 290.

Figure 6:
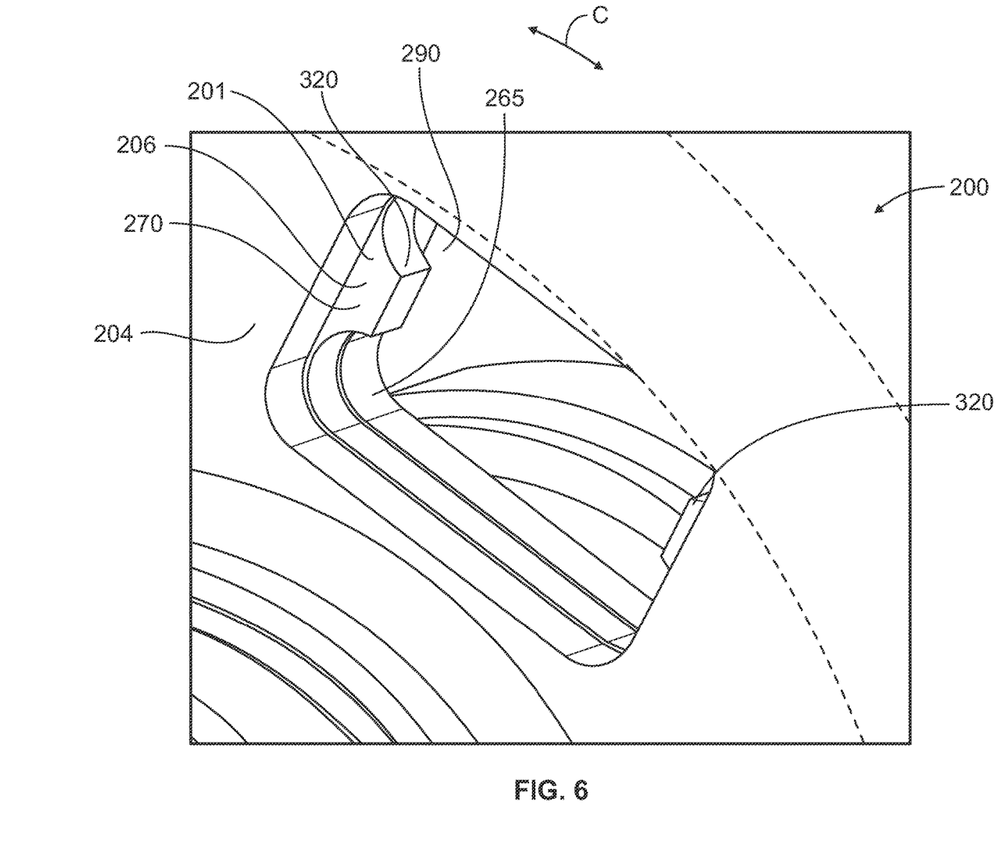
FIG. 6 illustrates a perspective front view of a spring channel of a bull gear sandwiched between first and second hubs of a shock absorber assembly, according to an embodiment of the present disclosure.

FIG. 6 illustrates a perspective front view of the spring channel 290 of the bull gear 201 sandwiched between the first and second hubs 204 and 265 of the shock absorber assembly 200, according to an embodiment of the present disclosure. For the sake of clarity, a spring is not shown within the spring channel 290, which is defined by the three aligned spring channels of the bull gear 201, the first hub 204, and the second hub 265. As shown, the planar portion 270 of the main body 206 of the bull gear 201 is sandwiched between the first and second hubs 204 and 265, and may include inwardly-directed protuberances 320, such as tabs, barbs, studs, posts, fins, or the like, that are coplanar with the planar portion 270. The protuberances 320 extend into the spring channel 290 and are configured to retain the spring at either end. For example, respective ends of the spring may wrap around the protuberances 320 to secure the spring in position.

As noted, when the bull gear 201 axially shifts (for example, rotates) in relation to the first and second hubs 204 and 265 in the directions of arc C, the springs 236 (shown in FIGS. 2-5) exert a resistive force into the edge portions of the bull gear 201 and the first and second hubs 204 and 265 that dissipates torque energy and prevents the bull gear 201 from rotating into the hubs 204 and 265 a distance that may cause portions of the bull gear 201 to undesirably impinge upon portions of the first and/or second hubs 204 and 265.

Figure 7:
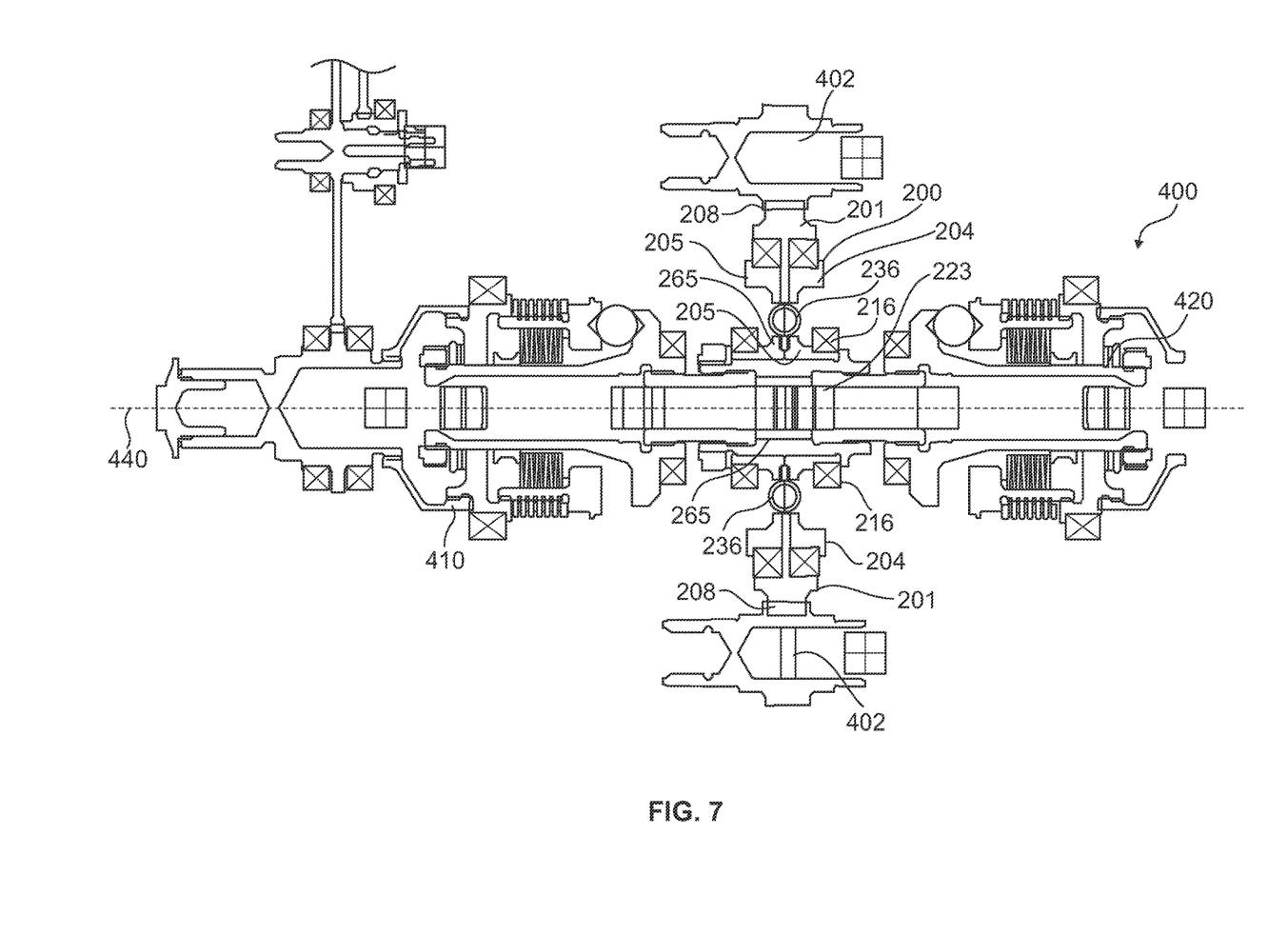
FIG. 7 illustrates a transverse cross-sectional view of a shock absorber assembly secured to a drive shaft of a power drive unit, according to an embodiment of the present disclosure.

FIG. 7 illustrates a transverse cross-sectional view of the shock absorber assembly 200 secured to the drive shaft 223 of a PDU 400, according to an embodiment of the present disclosure. The outer circumferential edge 208 of the bull gear 201 may be operatively connected to pinion gears 402, each of which is operatively connected to a motor (not shown). Alternatively, the bull gear 201 may be operatively connected to only one pinion gear 402.

The shock absorber assembly 200 is operatively secured to the drive shaft 223 between first and second torque brakes 410 and 420. For example, the drive shaft 223 may be secured within the collar 205 of the bull gear 201, and/or within a central passage defined by the bearing 216. A single shock absorber assembly 200 is operatively connected to the PDU 400 between the torque brakes 410 and 420, instead of each torque brake 410 and 420 being coupled to a separate and distinct shock absorber.

During normal operation, the motors drive the bull gear 201 to rotate about a central longitudinal axis 440 of the drive shaft 223. As the bull gear 201 rotates, the first and second hubs 204 and 265 rotate in response thereto. The brake lining interface between the bull gear 201 and the first and second hubs 204 and 265 provides a coefficient of friction that ensures that the hubs 204 and 265 rotate along with the bull gear 201 during normal operation.

During a system malfunction, however, such as when the drive shaft 223 immediately ceases moving (for example, a mechanical jam in the system), the motors continue to operate and generate torque. The energy of the motors, as translated into the bull gear 201 through the pinion gears 402, is dissipated by the frictional material interface, such as the brake lining 300 and/or the springs 236, between the bull gear 201 and the hubs 204, 265. The torque exerted into the bull gear 201 may cause the bull gear 201 to axially shift in relation to the hubs 204 and 265 when the drive shaft 223 is locked in place. The torque energy of the motor is dissipated by the brake lining. The coefficient of friction of the brake lining may be such as to allow the bull gear 201 to axially shift so that the bull gear 201 rotates independently of the hubs 204 and 265. The hubs 204 and 265 may be securely fastened together, such as through bolts, so as not to be able to rotate relative to each other. Also, during a system malfunction, the springs 236 also dissipate a portion of the torque energy, and compress lengthwise, thereby exerting a resistive force that resists the rotational motion of the bull gear 201 between the first and second hubs 204 and 265.

Accordingly, the torque energy generated by the motors during a mechanical malfunction of the PDU 400, such as a mechanical jam in which the drive shaft 223 locks in place, is absorbed by the rotational motion of the bull gear 201 with respect to the first and second hubs 204 and 265. Consequently, damage to components of the PDU 400, such as the torque brakes 410 and 420, is prevented by the single shock absorber assembly 200 disposed between the torque brakes 410 and 420. As shown, the shock absorber assembly 200 is disposed directly in a load path of the PDU 400, such as between the torque brakes 410 and 420.

Embodiments of the present disclosure provide a shock absorber assembly that reduces the part count for half system torque brakes, for example. Because the shock absorber assembly 200 is disposed within the load path of the PDU before the load path splits between right and left portions (such as right and left wings of an aircraft, for example), only a single shock absorber assembly may be used (instead of attaching separate and distinct shock absorbers to separate and distinct torque brakes). Further, in contrast to an automotive clutch or torque limiters, the shock absorber assembly is capable or reacting to radial loads imposed by gears, for example.

As described above, embodiments of the present disclosure provide a shock absorber assembly that may include a bull gear having at least a portion sandwiched between two hubs. The hubs and/or the bull gear may be lined, coated, covered, or the like with frictional material, such as brake lining. For example, brake lining may be bonded to an interior planar portion of the bull gear, and/or portions of one or both hubs that interface with the bull gear. A pair of rolling element bearings may be mounted on the bull gear that allow it to smoothly and evenly axially shift with respect to the hubs in the event of a system malfunction, such as when a drive shaft of a PDU locks or otherwise jams in position. One or more springs may be used to transmit torque from the bull gear to the hubs, for example.

Further, unlike previous shock absorbers used with PDUs, embodiments of the present disclosure provide shock absorber assemblies that do not include steel rings as a damping medium. Instead, embodiments of the present disclosure provide shock absorber assemblies that include brake lining between one or more interfaces between a bull gear and one or more hubs. The brake lining is lighter and more cost-effective than steel rings. Further the brake lining provides a consistent coefficient of friction, unlike a plurality or steel rings.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A shock absorber assembly configured to be operatively connected to a drive shaft of a power drive unit (PDU) of an aircraft, the shock absorber assembly comprising:
   a first hub;

a second hub;
a bull gear having at least a portion sandwiched between the first and second hubs, wherein the bull gear is configured to rotate independently of the first and second hubs a controlled distance in response to a mechanical malfunction of the PDU; and
one or more bearings, wherein the bull gear is rotatably secured to the one or more bearings.

2. The shock absorber assembly of claim 1, wherein at least one of the bull gear and the one or more bearings comprises a shaft channel that is configured to securely retain the drive shaft.

3. The shock absorber assembly of claim 1, wherein the first hub is a mirror image of the second hub.

4. The shock absorber assembly of claim 1, wherein the first hub, the second hub, and the bull gear are concentric.

5. The shock absorber assembly of claim 1, wherein the first and second hubs are securely fixed together in order to prevent the first hub from rotating relative to the second hub.

6. The shock absorber assembly of claim 1, wherein the bull gear includes a plurality of fastener channels, wherein each of the plurality of fastener channels slidably retains a portion of a fastener that securely fastens the first hub to the second hub.

7. The shock absorber assembly of claim 1, wherein the one or more bearings comprise a plurality of bearings.

8. The shock absorber assembly of claim 1, further comprising brake lining secured to one or more of the first hub, the second hub, and the bull gear, wherein the brake lining provides a frictional interface between the bull gear and one or both of the first and second hubs, wherein the brake lining provides a coefficient of friction that is configured to cause the bull gear to rotate along with the first and second hubs during normal operation of the PDU, and wherein the brake lining is configured to dissipate at least a portion of torque energy during the mechanical malfunction.

9. The shock absorber assembly of claim 8, wherein the brake lining comprises one or more of engineered paper, asbestos-based brake lining material, bronze on steel, steel on steel, or paper on steel.

10. The shock absorber assembly of claim 1, wherein each of the first hub, the second hub, and the bull gear comprises a plurality of channels, wherein the plurality of channels of the first hub align with the plurality of channels of the second hub and the bull gear, wherein the plurality of channels retain force-resisting elements that are configured to dissipate at least a portion of torque energy during the mechanical malfunction.

11. The shock absorber assembly of claim 10, the force-resisting elements comprise helical springs.

12. An aircraft comprising:
a fuselage;
wings securely fixed to the fuselage, wherein each of the wings includes a plurality of control surfaces;
a power drive unit (PDU) coupled to a drive shaft that is operatively coupled to one or more of the plurality of control surfaces, wherein the PDU includes first and second torque brakes operatively coupled to the drive shaft; and
a shock absorber assembly operatively coupled to the drive shaft between the first and second torque brakes, wherein the shock absorber assembly comprises: (a) a first hub; (b) a second hub; and (c) a bull gear having at least a portion sandwiched between the first and second hubs, wherein the bull gear is configured to rotate independently of the first and second hubs in response to a mechanical malfunction of the PDU.

13. The aircraft of claim 12, wherein the bull gear comprises an outer annular edge that is operatively coupled to at least one pinion gear.

14. The aircraft of claim 12, wherein at least one of the first and second hubs is lined with brake lining that interfaces with the bull gear, wherein the brake lining provides a coefficient of friction that causes the bull gear to rotate along with the first and second hubs during normal operation of the PDU, and wherein the brake lining dissipates at least a portion of torque energy during the mechanical malfunction.

15. The aircraft of claim 12, wherein each of the first hub, the second hub, and the bull gear comprises a plurality of channels, wherein the plurality of channels of the first hub align with the plurality of channels of the second hub and the bull gear, wherein the plurality of channels retain force-resisting elements that are configured to dissipate at least a portion of torque energy during the mechanical malfunction.

16. The aircraft of claim 12, wherein the shock absorber assembly further comprises one or more bearings, wherein the bull gear is rotatably secured to the one or more bearings.

17. The aircraft of claim 12, wherein the first hub is a mirror image of the second hub.

18. The aircraft of claim 12, wherein the first and second hubs are securely fixed together in order to prevent the first hub from rotating relative to the second hub, wherein the bull gear includes a plurality of fastener channels, wherein each of the plurality of fastener channels slidably retains a portion of a fastener that securely fastens the first hub to the second hub.

19. A shock absorber assembly configured to be operatively connected to a drive shaft of a power drive unit (PDU) of an aircraft, the shock absorber assembly comprising:
a first hub;
a second hub that is a mirror image of the first hub, wherein the first and second hubs are securely fixed together in order to prevent the first hub from rotating relative to the second hub;
a bull gear having at least a portion sandwiched between the first and second hubs, wherein the bull gear is configured to rotate independently of the first and second hubs a controlled distance in response to a mechanical malfunction of the PDU;
one or more bearings, wherein the bull gear is rotatably secured to the one or more bearings, wherein at least one of the bull gear and the one or more bearings comprises a shaft channel that is configured to securely retain the drive shaft; and
brake lining secured to one or more of the first hub, the second hub, and the bull gear, wherein the brake lining provides a frictional interface between the bull gear and one or both of the first and second hubs, wherein the brake lining provides a coefficient of friction that is configured to cause the bull gear to rotate along with the first and second hubs during normal operation of the PDU, and wherein the brake lining is configured to dissipate at least a portion of torque energy during the mechanical malfunction.

20. The shock absorber assembly of claim 19, wherein each of the first hub, the second hub, and the bull gear comprises a plurality of spring channels, wherein the plurality of spring channels of the first hub align with the plurality of spring channels of the second hub and the bull gear, wherein the plurality of spring channels retain helical springs that are configured to dissipate at least a portion of torque energy during the mechanical malfunction.

* * * * *